United States Patent
Gondel et al.

(10) Patent No.: US 10,708,735 B2
(45) Date of Patent: Jul. 7, 2020

(54) METHOD AND SERVER FOR PERFORMING CAPABILITY DISCOVERY

(71) Applicant: Provenance Asset Group LLC, Essex, CT (US)

(72) Inventors: Antoine Gondel, Nozay (FR); Pierre-Henri Gross, Nozay (FR)

(73) Assignee: Provenance Asset Group LLC, Pittsford, NY (US)

( * ) Notice: Subject to any disclaimer, the term of this patent is extended or adjusted under 35 U.S.C. 154(b) by 213 days.

(21) Appl. No.: 15/326,253

(22) PCT Filed: Jul. 16, 2015

(86) PCT No.: PCT/EP2015/066284
§ 371 (c)(1),
(2) Date: Jan. 13, 2017

(87) PCT Pub. No.: WO2016/008983
PCT Pub. Date: Jan. 21, 2016

(65) Prior Publication Data
US 2017/0208453 A1 Jul. 20, 2017

(30) Foreign Application Priority Data

Jul. 18, 2014 (EP) ..................................... 14177676

(51) Int. Cl.
*H04W 4/50* (2018.01)
*H04L 29/12* (2006.01)
(Continued)

(52) U.S. Cl.
CPC ........... *H04W 4/50* (2018.02); *H04L 61/1594* (2013.01); *H04L 65/1006* (2013.01);
(Continued)

(58) Field of Classification Search
CPC ...... H04W 4/50; H04W 8/22; H04L 65/1016; H04L 65/1006; H04L 61/1594; H04L 67/24; H04L 69/24
(Continued)

(56) References Cited

U.S. PATENT DOCUMENTS

| 2011/0138054 A1* | 6/2011 | Ben-Ezra | H04L 51/043 709/226 |
| 2012/0011244 A1* | 1/2012 | Zhu | G06F 21/105 709/224 |

(Continued)

OTHER PUBLICATIONS

RFC 5367 (Subscriptions to Request-Contained Resource Lists in the Session Initiation Protocol (SIP), Oct. 2008.) (Year: 2008).*
(Continued)

*Primary Examiner* — Chris Parry
*Assistant Examiner* — Weiwei Y Stiltner
(74) *Attorney, Agent, or Firm* — Dinsmore & Shohl LLP

(57) ABSTRACT

The invention relates to a method for performing a capability discovery. The method is implemented by a home server (10) and comprising the steps of:—receiving (101), from a user terminal (11), a principal discovery request (12) comprising a complete contact list,—from the complete contact list, determining (102) which contacts are locally known, and which contacts are locally unknown,—generating a limited contact list containing all contacts that are locally unknown,—sending (103) a plurality of secondary discovery requests (19) comprising the limited contact list to a plurality of remote servers (17, 18),—receiving (104), from each remote server (17, 18), a notification (16) containing information about contacts contained in the limited contact list,—sending (105), for each unknown contact by the home server (10) and the plurality of remote servers (17, 18), a back-end subscription to a home IMS core (21).

12 Claims, 3 Drawing Sheets

(51) Int. Cl.
*H04L 29/08* (2006.01)
*H04L 29/06* (2006.01)
*H04W 8/22* (2009.01)

(52) U.S. Cl.
CPC .......... *H04L 65/1016* (2013.01); *H04L 67/24* (2013.01); *H04W 8/22* (2013.01); *H04L 69/24* (2013.01)

(58) Field of Classification Search
USPC ........................................................ 709/219
See application file for complete search history.

(56) References Cited

U.S. PATENT DOCUMENTS

2015/0066641 A1* 3/2015 Dudley .............. G06Q 30/0261
705/14.51
2015/0131478 A1* 5/2015 Bouvet ............... H04L 65/1006
370/254
2016/0285915 A1* 9/2016 Lidin ...................... H04W 8/24
2016/0295390 A1* 10/2016 Gonzalez De Langarica ..............
H04L 67/16

OTHER PUBLICATIONS

GSM Association, "Rich Communication Suite 5.1 Advanced Communication Services and Client Specification—Version 4.0," pp. 1-7 and 78-116, XP055164102, Nov. 28, 2013.
Open Mobile Alliance, Resource List Server (RLS) Specification Approved Version 1.0—Jul. 10, 2012, OMA-TS-Presence_Simple_RLS-V1_0-20120710-A, pp. 1-17, X9064159143, 2012.
A. B. Roach et al., "A Session Initiation Protocol (SIP) Event Notification Extension for Resource Lists," pp. 1-39, XP015047413, Aug. 2006.
International Search Report for PCT/EP2015/066284 dated Sep. 15, 2015.

* cited by examiner

METHOD AND SERVER FOR PERFORMING CAPABILITY DISCOVERY

FIELD OF THE INVENTION

The present invention relates to a method for performing a capability discovery. More particularly, the present invention relates to a method for performing a capability discovery associated with the use of Rich Communication Suite (RCS) services with respect to contact information stored in a user equipment.

DESCRIPTION OF THE BACKGROUND ART

Rich Communication Suite services provide various communication functions to a user of a user equipment, for instance a mobile phone, through a communication network, based on the standard specifications set by the Global System for Mobile Communication Association (GSMA).

As depicted in FIG. 1, in a current presence based solution, to achieve the capability discovery as required by the RCS standardization, a user equipment 1 sends a subscription 2 to its home Resource List Server (RLS) server 3 in its home domain 4. Usually, the subscriptions comprise a contact list containing hundreds of contact information. Then, the home server 3 analyzes the contacts contained in the contact list and, for each contact locally unknown, the home server 3 sends a corresponding Back-End (BE) subscription 5 to a home IP Multimedia (IMS) core 6. Finally, the home IMS core 6 sends subscriptions 7 to a plurality of remote domain (also named partner domain). Given that a typical size of a contact list is several hundred entries, and that initially, only a few percent of them will be locally know by the home server 3, this approach is generating a lot of Back-End subscriptions 5 on the home IMS core 6. This causes a problem in that the amounts of Back-End subscriptions 5 periodically flood the home IMS core 6 and the IMS core of the remote domains.

The above information is presented as background information only to assist with an understanding of the present disclosure. No determination has been made, and no assertion is made, as to whether any of the above might be applicable as prior art with regard to the present invention.

SUMMARY OF THE INVENTION

An aspect of the invention is therefore to overcome the drawback aforementioned. Accordingly, embodiments of the invention are directed to a method and an apparatus for performing a capability discovery that has a minimal impact on the IMS network capacity and behavior.

This summary is not intended to identify essential features of the claimed subject matter nor is it intended for use in determining or limiting the scope of the claimed subject matter.

In an embodiment, a method for performing a capability discovery, is implemented by a home server and comprises the steps of:
  receiving, from a user terminal, a principal discovery request comprising a complete contact list,
  from the complete contact list, determining which contacts are locally known, and which contacts are locally unknown,
  generating a limited contact list containing all contacts that are locally unknown,
  sending a plurality of secondary discovery requests comprising the limited contact list to a plurality of remote servers,
  receiving, from each remote server, a notification containing information about contacts contained in the limited contact list,
  sending, for each unknown contact by the home server and the plurality of remote servers, a back-end subscription to a home IMS core.

This embodiment, and more particularly the fact that the home server sends a limited number of secondary requests to a plurality of remote servers in order to obtain information before sending back-end subscription to the home IMS core, allows obtaining an efficient capability discovery mechanism that has a minimal impact on the IMS network capacity and behavior.

The claimed subject matter may also have one or more of the additional features below, taken individually or in any technically feasible combination.

In a not limited embodiment, a single secondary discovery request containing the limited contact list is sent to each remote server. This therefore limits the inter-domain traffic supported by the network.

In a not limited embodiment, the principal discovery request is a Resource List Server subscription with a Request-Contained list using the Session Initiation Protocol RFC 5367.

In a not limited embodiment, each secondary discovery request is a Resource List Server subscription with a Request-Contained list using the Session Initiation Protocol (SIP) RFC 5367.

In a not limited embodiment, each secondary discovery request is performed by the home server using a Public Service Identity identification identical to the Public Service Identity identification supported by each remote server.

In a not limited embodiment, the limited contact list contains all contacts of the complete contact list unknown by the home server.

In a not limited embodiment, the notification containing information about contacts contained in the limited contact list indicates the contacts that are RCS enabled.

In a not limited embodiment, the notification containing information about contacts contained in the limited contact list indicates the contacts that are IMS enabled.

In a not limited embodiment, the notification containing information about contacts contained in the limited contact list indicates the contacts that are not IMS enabled.

In a not limited embodiment, when a remote server has no information about a contact, then the notification indicates for said contact a state of terminated and a reason of no resource.

In a not limited embodiment, when a remote server has a contact not RCS enabled, then the notification indicates for said contact a state of terminated and a reason of rejected.

The invention relates also to a home server for performing a capability discovery comprising:
  a processor;
  a memory;
  at least one input/output module constructed and arranged to receive from a user terminal a principal discovery request comprising a complete contact list,
wherein the processor is constructed and arranged to execute instructions contained in the memory in order to determine, from the complete contact list, which contacts are locally known, and which contacts are locally unknown to generate a limited contact list;

and wherein the input/output module is constructed and arranged to send to a plurality of remote servers, for all contacts that are locally unknown, a plurality of secondary discovery requests comprising the limited contact list, to receive from each remote server a notification about contacts contained in the limited contact list, and to send, for each unknown contact by the home server and the plurality of remote servers, a back-end subscription to a home IMS core. In a not limited embodiment, the home server is a Resource List Server.

BRIEF DESCRIPTION OF THE DRAWINGS

The accompanying drawings are included to provide a further understanding of the invention and are incorporated in and constitute a part of this specification, to illustrate embodiments of the invention and, together with the description, to explain the principles of the invention.

For reasons of clarity, only those elements beneficial for comprehension of the invention have been shown, more specifically schematically and with no regard for scale. Furthermore, like elements illustrated in different figures are denoted by like reference numerals.

DESCRIPTION OF SPECIFIC EMBODIMENTS

Figure 1:
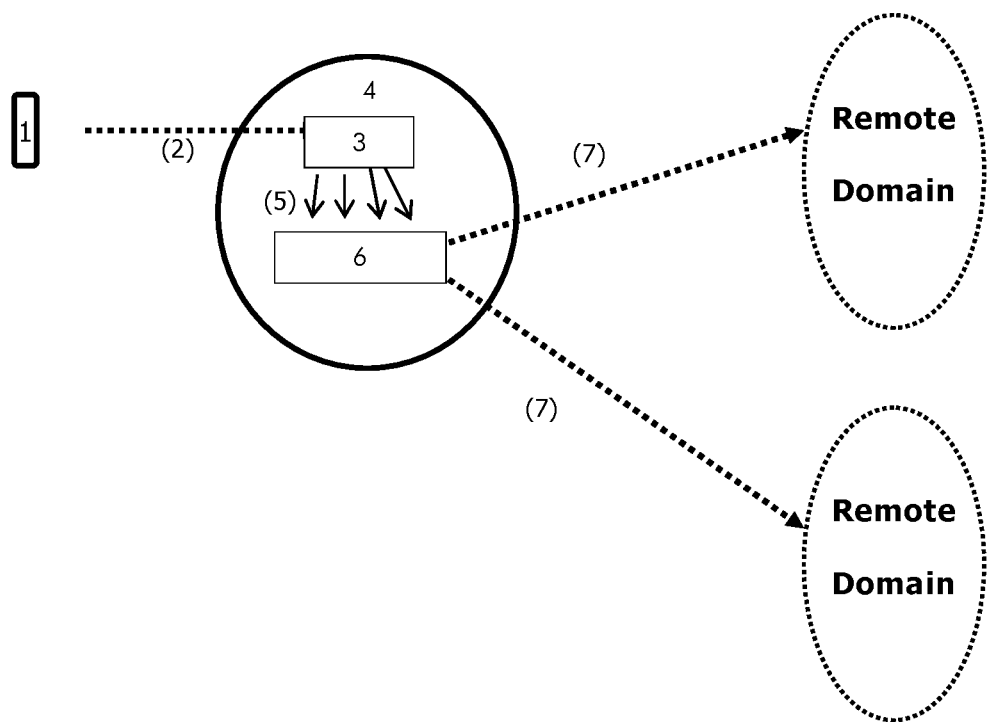
FIG. 1 illustrates a method for performing a capability discovery according to the background art.
Figure 2:
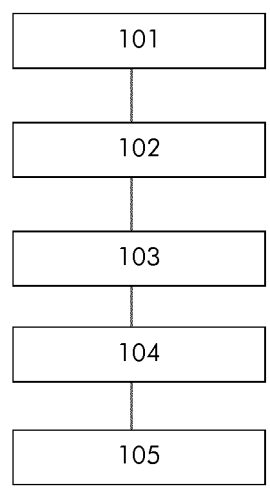
FIG. 2 illustrates, in a not limited embodiment, the steps of a method for performing a capability discovery according to the invention.
Figure 3:
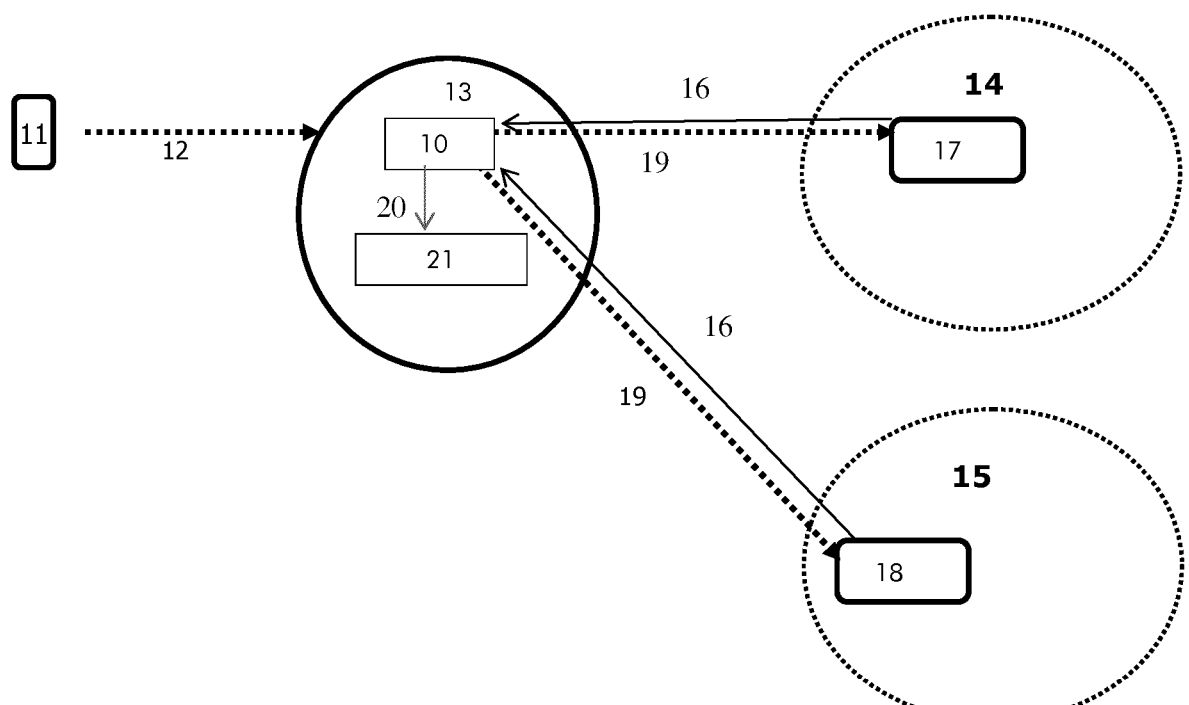
FIG. 3 depicts, in a not limited embodiment, a home server adapted to implement the method for performing a capability discovery according to the invention.

In reference to FIG. 2, a method for performing a capability discovery is represented. Further, the FIG. 3 illustrates a home server 10 for performing a capability discovery. More particularly, the home server 10 is adapted and constructed to implement the steps of the method for performing a capability discovery. In a not limited embodiment, the home server 10 is a Resource List Server/Presence Server (RLS/PS).

The method for performing a capability discovery comprises a step of receiving 101 a principal discovery request 12 comprising a complete contact list. The principal discovery request 12 is sent by a user terminal 11. In a not limited embodiment, the principal discovery request 12 is a Resource List Server (RLS) subscription with a Request-Contained list using the Session Initiation Protocol (SIP) RFC 5367.

Figure 4:
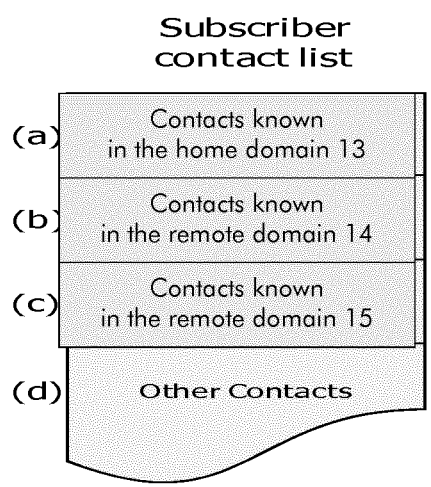
FIG. 4 depicts, in a not limited embodiment, the content of a complete contact list embedded in a principal discovery request.

The FIG. 4 describes, in a not limited embodiment, the content of the complete contact list embedded in the principal discovery request 12 and received by the home server 10 of an home domain 13. The complete contact list contains contacts (a) that are known in the home domain 13 (i.e. by the home server 10), contacts (b) that are known in a peering domain 14 (i.e. by a remote server 17 of the domain 14), and contacts (c) known in a peering domain 15 (i.e. by a remote server 18 of the domain 15), and so on. Finally, the complete contact list contains contacts (d) that are unknown in any peering domains 14, 15. In a not limited embodiment, the home domain 13 and each remote domain 14, 15 are identified by domain names like example.com, example.net or wireless.provider.com. In a not limited embodiment, a contact of the complete contact list is represented as a Tel-Uri (RFC 3966) such as tel: +1-201-555-0123.

The method for performing a capability discovery comprises a step of determining 102, from the complete contact list, which contacts are locally known. In other terms, when receiving the principal discovery request 12 from the user equipment 11, the home server 10 determines which contacts are local to the home domain 13, using any available means. For example, the home server 10 determines which contacts are local to the home domain 13 by querying a local or a global database or possibly performing some ENUM queries as described in E.164 Number Mapping (ENUM) standard RFC 6116.

The method for performing a capability discovery comprises, for all contacts that are locally unknown, a step of sending 103, from the home server 10, a plurality of secondary discovery requests 19 comprising a limited contact list to a plurality of remote servers 17 and 18. In a not limited embodiment of the invention, the plurality of secondary discovery requests 19 are routed to the plurality of remote servers 17, 18 by the home IMS core 21. More particularly, the home IMS core 21 routes the plurality of secondary discovery requests 19 to the remote IMS cores (not illustrated) of the remote domains 14, 15, which remote IMS cores route the plurality of secondary discovery requests 19 to their remote server 17, 18. For reasons of clarity, this routing is not illustrated.

In a not limited embodiment, each remote server 17, 18 is a Resource List Server/Presence Server (RLS/PS) and one single secondary discovery request 19 containing the limited contact list is sent per remote server 17, 18. It could be noted that the limited contact list contains only the contacts of the complete contact list unknown by the home server 10. In other terms, the local contacts of the complete contact list have been removed. In a not limited embodiment, each secondary discovery request 19 sent is a RLS subscription with a Request-Contained list using the Session Initiation Protocol (SIP) RFC 5367.

In a not limited embodiment, all secondary discovery requests 19 are performed by the home server 10 using a Public Service Identity (PSI) as defined in [3GPP TS 23.168] and [3GPP TS 24.169]. For making the peering as simple as possible and limit configuration impacts, all interconnected domains (i.e. home domain 13, and remote domains 14, 15) support the same PSI identification, typically based on a common sub-domain identification.

Figure 5:
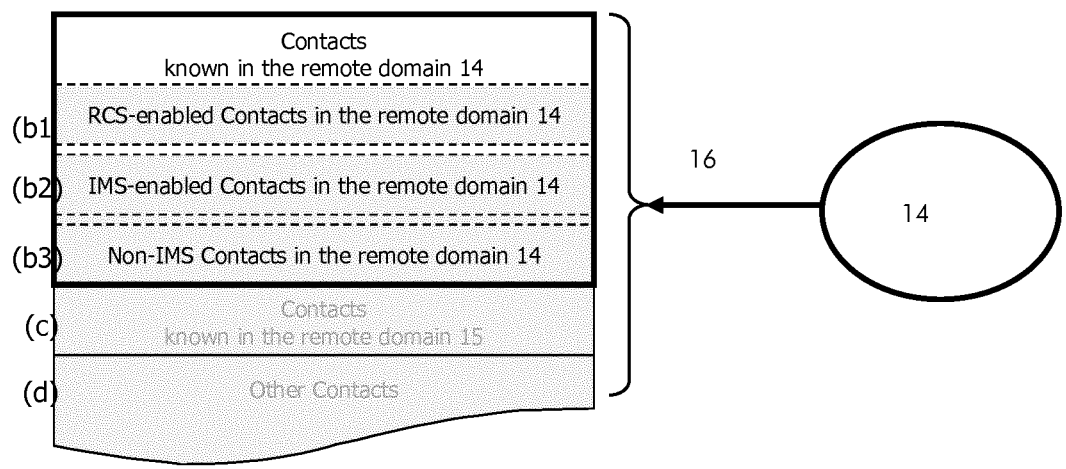
FIG. 5 depicts, in a not limited embodiment, a notification that each remote server provides about its known contacts.

The method for performing a capability discovery comprises further a step of receiving 104 a notification 16 containing information about contacts contained in the limited contact list. A notification 16 is sent by each remote server 17, 18 to the home server 10. In a not limited embodiment, each notification 16 received by the home server 10 contains a Resource-List Meta Information (RLMI) document. This RLMI document includes, for instance, three types of information, as described in the FIG. 5:

(b1) The list of contacts that are RCS enabled, so presence enabled,
(b2) The list of contacts that are IMS enabled (so presumably in the ENUM base), but not RCS or presence enabled,
(b3) The list of contacts that are not IMS enabled (and so an ENUM resolution would certainly fail).

In a not limited embodiment, the different types of contacts are mapped onto different instance state in the RLMI documents to allow the home server 10 to take the right decision as to the remaining subscriptions to be performed and to report correct information to the user equipment 11. For instance, when a remote server 17 or 18 has no information about a contact, then the notification received by the home server 10 indicates for said contact a state of terminated and a reason of "noresource". Further, when a remote server 17 or 18 has a contact not RCS enabled, then the notification 16 received by the home server 10 indicates for said contact a state of terminated and a reason of rejected. Remaining contacts may have an instance state according to usual practices.

The method for performing a capability discovery comprises a step of sending 105 from the home server 10, for each unknown contact by the home server 10 and the plurality of remote servers 17, 18, a back-end subscription 20 to a home IMS core 21. For that step 105, when the home server 10 receives answers from all domain partner 14, 15, the home server 10 aggregates the information to determine the contacts that are still unknown.

When performing the aggregation, the home server 10 can applies the following rule: any state/reason takes precedence over a state/reason of "terminated/noresource". Given that policy, the home server performs BE subscriptions for the resources whose state is still unknown, i.e. the following ones:

No state information has ever been reported by any remote RLS servers for that resource.

After the aggregation operation, the state/reason of the resource is still "terminated/noresource".

In a not limited embodiment, each remote server 17, 18 always provide the first type of information b1 (i.e. the list of contacts that are RCS enabled). When possible, each remote server 17, 18 also provide the other types of information b2 (The list of contacts that are IMS enabled) and b3 (The list of contacts that are not IMS enabled), to narrow even more the number of remaining Back-End subscriptions to be performed by the home server 10.

Figure 6:
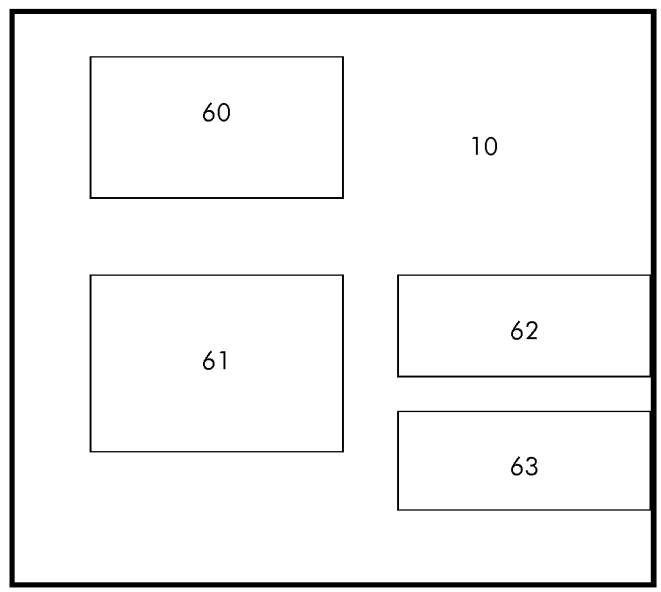
FIG. 6 illustrates, in a not limited embodiment, a home server for performing a capability discovery.

The invention relates also to a home server 10 for performing a capability discovery. An example of a home server 10 according to the invention is illustrated in FIG. 6.

The home server 10 comprises a processor 60, a memory 61 an input/output module 62 for receiving/sending data from/to a user terminal 11 and an input/output module 63 for receiving/sending data to remote servers 17, 18. The input/output modules 62, 63 may alternatively be implemented in a single module.

The module 62 is constructed and arranged to receive from a user terminal 11 a principal discovery request 12 comprising a complete contact list.

The processor 60 is constructed and arranged to execute instructions contained in the memory 61 in order to determine, from the complete contact list, which contacts are locally known and which contacts are locally unknown to generate a limited contact list.

The module 63 is constructed and arranged to send to a plurality of remote servers 17, 18, for all contacts that are locally unknown, a plurality of secondary discovery requests 19 comprising the limited contact list. The module 63 is further arranged to receive from each remote server 17, 18, a notification 16 containing information about contacts contained in the limited contact list and to send, for each unknown contact by the home server 10 and the plurality of remote servers 17, 18, a back-end subscription 20 to a home IMS core 21.

It is to be noted that the home server 10 may each include one or more processors executing one or more sequences of one or more instructions contained in a memory to perform their intended functions (carry out comparison, collect information, send information, . . . ). In alternative embodiments, hard-wired circuitry may be used in place of or in combination with software instructions to implement the invention. Thus, embodiments of the invention are not limited to any specific combination of hardware circuitry and software.

It is to be understood that the present invention contemplates that, to the extent possible, one or more features of any embodiment can be combined with one or more features of any other embodiment.

The descriptions above are intended to be illustrative, not limiting. Thus, it will be apparent to one skilled in the art that modifications may be made to the invention as described without departing from the scope of the claims set out below.

The invention claimed is:

1. Method for performing a capability discovery, said method being implemented by a home server of a home domain and comprising:
   receiving, from a user terminal, a principal discovery request comprising a complete contact list,
   from the complete contact list, determining which contacts are locally known in the home domain, and which contacts are locally unknown in the home domain,
   generating a limited contact list containing all contacts that are locally unknown,
   sending a plurality of secondary discovery requests comprising the limited contact list to a plurality of remote servers,
   receiving, from each remote server, a notification containing capability discovery contact information about contacts contained in the limited contact list, including which contacts are remotely known and remotely unknown in each remote server of a respective remote domain, and
   sending, for each unknown contact both locally unknown by the home server and remotely unknown to the plurality of remote servers, a back-end subscription to a home Internet Protocol Multimedia Subsystem (IMS) core.

2. Method according to claim 1, wherein a single secondary discovery request containing the limited contact list is sent to each remote server.

3. Method according to claim 1, wherein the principal discovery request is a Resource List Server subscription with a Request-Contained list using the Session Initiation Protocol Request for Comments (RFC) 5367.

4. Method according to claim 1, wherein each secondary discovery request is a Resource List Server subscription with a Request-Contained list using the Session Initiation Protocol RFC 5367.

5. Method according to claim 1, wherein each secondary discovery request is performed by the home server using a Public Service Identity identification identical to the Public Service Identity identification supported by each remote server.

6. Method according to claim 1, wherein the notification containing information about contacts contained in the limited contact list indicates the contacts that are Rich Communication Suite (RCS) enabled.

7. Method according to claim 1, wherein the notification containing information about contacts contained in the limited contact list indicates the contacts that are IMS enabled.

8. Method according to claim 1, wherein the notification containing information about contacts contained in the limited contact list indicates the contacts that are not IMS enabled.

9. Method according to claim 1, wherein when a remote server has no information about a contact, then the notification indicates for said contact a state of terminated and a reason of no resource.

10. Method according to claim 6, wherein when a remote server has a contact not RCS enabled, then the notification indicates for said contact a state of terminated and a reason of rejected.

11. Home server of a home domain for performing a capability discovery comprising:
- a processor;
- a memory;
- at least one input/output module constructed and arranged to receive from a user terminal a principal discovery request comprising a complete contact list, wherein the processor is constructed and arranged to execute instructions contained in the memory in order to determine, from the complete contact list, which contacts are locally known in the home domain, and which contacts are locally unknown in the home domain to generate a limited contact list;

and wherein the input/output module is constructed and arranged to send to a plurality of remote servers, for all contacts that are locally unknown in the home domain, a plurality of secondary discovery requests comprising the limited contact list, to receive from each remote server a notification containing capability discovery contact information about contacts contained in the limited contact list, including which contacts are remotely known and remotely unknown in each remote server of a respective remote domain, and to send, for each unknown contact both locally unknown by the home server and remotely unknown to the plurality of remote servers, a back-end subscription to a home IMS core.

12. Home server according to claim 11, wherein the home server is a Resource List Server.

* * * * *